US007484112B2

(12) United States Patent
Noorbakhsh et al.

(10) Patent No.: US 7,484,112 B2
(45) Date of Patent: Jan. 27, 2009

(54) POWER MANAGEMENT IN A DISPLAY CONTROLLER

(75) Inventors: Ali Noorbakhsh, Danville, CA (US); David Keene, Corrales, NM (US); John Lattanzi, Palo Alto, CA (US); Ram Chilukuri, San Jose, CA (US)

(73) Assignee: Genesis Microchip Inc., Santa Clara, CA (US)

(*) Notice: Subject to any disclaimer, the term of this patent is extended or adjusted under 35 U.S.C. 154(b) by 363 days.

(21) Appl. No.: 11/060,917

(22) Filed: Feb. 18, 2005

(65) Prior Publication Data

US 2006/0082569 A1 Apr. 20, 2006

Related U.S. Application Data

(60) Provisional application No. 60/620,094, filed on Oct. 18, 2004.

(51) Int. Cl.
*G06F 1/26* (2006.01)

(52) U.S. Cl. .......................... 713/340; 713/322; 345/52

(58) Field of Classification Search ................. 713/340, 713/322; 345/52
See application file for complete search history.

(56) References Cited

U.S. PATENT DOCUMENTS

| | | | | |
|---|---|---|---|---|
| 5,388,208 | A | 2/1995 | Weingartner et al. | |
| 5,757,365 | A | 5/1998 | Ho | |
| 6,101,329 | A | 8/2000 | Graef | |
| 6,219,643 | B1 | 4/2001 | Cohen et al. | |
| 6,463,879 | B1 | 10/2002 | Campbell et al. | |
| 6,742,133 | B2 | 5/2004 | Saeki | |
| 6,763,478 | B1 * | 7/2004 | Bui | 713/600 |
| 6,952,139 | B2 | 10/2005 | Endo et al. | |
| 6,954,863 | B2 * | 10/2005 | Mouton | 713/300 |
| 7,000,127 | B2 | 2/2006 | D'Alessio | |
| 7,136,042 | B2 | 11/2006 | Magendanz et al. | |
| H002186 | H | 4/2007 | Noorbakhsh et al. | |
| 7,263,625 | B2 | 8/2007 | Katoh et al. | |
| 2001/0032321 | A1 * | 10/2001 | Nanno et al. | 713/300 |

(Continued)

FOREIGN PATENT DOCUMENTS

WO WO 03/071413 8/2003

OTHER PUBLICATIONS

Office Action dated Mar. 7, 2007 in related U.S. Appl. No. 11/060,862.

(Continued)

*Primary Examiner*—Thuan N Du
(74) *Attorney, Agent, or Firm*—Bayer Law Group LLP

(57) ABSTRACT

Managing power in a display controller having an on-board power supply coupled to a host device having an off-board power supply by way of a connector is described. If the on-board power supply is active, then power is supplied to the display controller by the off-board power supply by way of the connector and a low frequency clock arranged to provide a low frequency clock signal is turned on. Alternatively, when it is determined that the on-board power supply is active, then power is supplied to the display controller by the on-board power supply only, the low frequency clock is turned off and a high frequency clock arranged to provide a high frequency clock signal is turned on.

17 Claims, 11 Drawing Sheets

U.S. PATENT DOCUMENTS

| | | | | |
|---|---|---|---|---|
| 2003/0204761 | A1 | 10/2003 | D'Alessio | |
| 2003/0214507 | A1 | 11/2003 | Mawatari et al. | |
| 2004/0027357 | A1 | 2/2004 | Mendelson et al. | |
| 2004/0119731 | A1 | 6/2004 | Lee | |
| 2004/0150650 | A1 | 8/2004 | Mendelson et al. | |
| 2005/0110618 | A1* | 5/2005 | Creff et al. | 340/333 |
| 2005/0289378 | A1* | 12/2005 | Vorenkamp et al. | 713/340 |
| 2006/0082584 | A1 | 4/2006 | Noorbakhsh et al. | |
| 2006/0082586 | A1 | 4/2006 | Noorbakhsh et al. | |
| 2006/0082587 | A1 | 4/2006 | Noorbakhsh et al. | |
| 2006/0085627 | A1 | 4/2006 | Noorbakhsh et al. | |
| 2006/0091943 | A1 | 5/2006 | Noorbakhsh et al. | |

OTHER PUBLICATIONS

Office Action dated Feb. 26, 2007 in related U.S. Appl. No. 11/061,165.

Office Action dated Jul. 3, 2007 in related U.S. Appl. No. 11/061,165.

Office Action dated Feb. 22, 2007 in related U.S. Appl. No. 11/061,151.

Office Action dated Jul. 2, 2007 in related U.S. Appl. No. 11/061,151.

Australian Patent Office Written Opinion and Search Report dated Oct. 9, 2006 in related application SG 200506305-2 (GENSP128SG).

Australian Patent Office Examination Report dated May 18, 2007 from related application SG 200506305-2 (GENSP128SG).

Office Action dated Dec. 13, 2007 in U.S. Appl. No. 11/061,165.

Office Action dated Jan. 2, 2008 in U.S. Appl. No. 11/061,151.

Office Action dated Jan. 25, 2008 in U.S. Appl. No. 11/060,862.

Office Action dated Jan. 8, 2008 in U.S. Appl. No. 11/061,228.

VESA—Video Electronics Standards Association, "E-EDID Implementation Guide," Version 1.0, Jun. 4, 2001.

Office Action dated Apr. 30, 2008 in U.S. Appl. No. 11/060,873.

* cited by examiner

POWER MANAGEMENT IN A DISPLAY CONTROLLER

CROSS REFERENCE TO RELATED APPLICATIONS

This patent application takes priority under 35 U.S.C. 119 (*e*) to U.S. Provisional Patent Application No.: 60/620,094, filed on Oct. 18, 2004 entitled "VIRTUAL EXTENDED DISPLAY IDENTIFICATION DATA (EDID)" by Noorbakhsh et al., which is hereby incorporated by reference herein in its entirety. This application is also related to the following co-pending U.S. patent applications, which are filed concurrently with this application and each of which are herein incorporated by reference, (i) U.S. patent application Ser. No. 11/061,249still pending entitled "ACQUISITION OF EXTENDED DISPLAY IDENTIFICATION DATA (EDID) IN A DISPLAY CONTROLLER IN A POWER UP MODE FROM A POWER DOWN MODE" naming Noorbakhsh et al. as inventors that published as US H002,186 on Apr. 3, 2007; (ii) U.S. patent application Ser. No. 11/060,873 still pending entitled "ARBITRATION FOR ACQUISITION OF EXTENDED DISPLAY INDENTIFICATION DATA (EDID)" naming Noorbakhsh et al. as inventors; (iii) U.S. patent application Ser. No. 11/060,862, still pending entitled "ACQUISITION OF EXTENDED DISPLAY INDENTIFICATION DATA (EDID) USING INTER-IC (IC2) PROTOCOL", naming Noorbakhsh et al. as inventors; (iv) U.S. patent application Ser. No. 11/061,151 still pending entitled "VIRTUAL EXTENDED DISPLAY INFORMATION DATA (EDID) IN A FLAT PANEL CONTROLLER", naming Noorbakhsh et al. as inventors; (v) U.S. patent application Ser. No. 11/061,228, still pending entitled "AUTOMATIC ACTIVITY DETECTION IN A DISPLAY CONTROLLER", naming Noorbakhsh et al. as inventors; and (vi) U.S. patent application Ser. No. 11/061,165, still pending entitled "METHOD FOR ACQUIRING EXTENDED DISPLAY IDENTIFICATION DATA (EDID) IN A POWERED DOWN EDID COMPLIANT DISPLAY CONTROLLER", naming Noorbakhsh et al. as inventors each of which are incorporated by reference in their entireties for all purposes.

FIELD OF THE INVENTION

The invention relates to display devices. More specifically, the invention describes a method and apparatus for enabling a display device to access a single memory device that stores both digital and analog display information.

BACKGROUND

With computers, the Basic Input Output System (BIOS) queries the port of a computer to determine whether a monitor is present. If a monitor is present, the BIOS downloads standardized data that is typically contained at a read only memory (ROM) within the monitor. This standardized data is typically referred to as an Extended Display Identification Data (EDID) that contains information relating to the monitor that includes such information as the type, model, and functionality of the monitor. Typically, the BIOS contains a table that lists all of the various monitors that are supported by the computer. When a monitor is connected to the port, the BIOS reads selected information from the EDID and compares the EDID to the BIOS stored monitor data. The standard protocol requires the BIOS to read the monitor's information even when the monitor is powered off. In this case, a small amount of power is supplied by the computer through the monitor connector to the monitor to run and access the EDID storage device.

If a match between the EDID and the BIOS stored monitor data is found, the computer system is configured to utilize this particular type of monitor and its capabilities. For instance, if the monitor has a volume control or a sleep button, the computer is configured to support this functionality. However, if the information from the EDID does not match the BIOS stored monitor data, then the computer assumes that it is communicating with a "legacy" monitor. A legacy monitor is a term that refers to a monitor having basic functionality, such as a relatively older, outdated monitor. Thus, the BIOS configures the computer into a default configuration to operate with a legacy monitor.

Presently, a DDC monitor (Display Data Channel) includes a storage device, such as an EEPROM, that stores EDID regarding the capabilities of the monitor, such as the monitor's resolution and refresh rates. The EDID format is a standard data format developed by VESA (Video Electronics Standards Association) to promote greater monitor/host computer compatibility. At the present time, the current EDID format is described in Appendix D of Display Data Channel (DDC™) Standard, version 1.0 revision 0, dated Aug. 12, 1994. For a personal computer utilizing a DDC monitor, the system software accesses the DDC related EDID that is stored within the monitor. The system software also determines the type of video controller that is installed in the system. The video controller is used to control and configure the video data sent to the monitor. The system software then compares the refresh rate obtained from the DDC monitor to the capabilities of the video controller to determine the proper refresh rate to set at the video controller, which in turn controls the monitor.

Typically, EDID is display information accessible to the host even when the monitor is powered down. In monitors that support a "dual interface" (both analog and digital connectors supported), there are typically two separate standard EDID ROM devices, located on the flat panel controller board, that store the analog and digital EDID. The EDID is accessed via dedicated DDC bus. In the conventional dual panel flat panel controller design, the two EDID ROM devices, reside on flat panel controller, are powered from the host power supplies with analog cable (VGA DDC cable) for analog EDID ROM, and digital cable (DDC_DVI cable) for digital EDID ROM. The cost of having two EDID ROM devices on flat panel controller board is expensive.

With the current cost pressure market, there is a need for a solution to support the EDID through DDC ports without having two separate EDID ROM devices. Unfortunately, however, there is a limited power budget for DDC port cables in use today.

Therefore, what is desired is an invention that provides a virtual EDID read operation within the limited power budget currently allowed for DDC port cables.

SUMMARY OF THE INVENTION

A method for acquiring EDID from a single memory device in an EDID compliant display controller by a host device coupled thereto by way of a requesting port is described.

A method of managing power in a display controller having an on-board power supply coupled to a host device having an off-board power supply by way of a connector is described. If the on-board power supply is active, then power is supplied to the display controller by the off-board power supply by way of the connector and a low frequency clock arranged to provide a low frequency clock signal is turned on. Alternatively, when it is determined that the on-board power supply is active, then power is supplied to the display controller by the on-board power supply only, the low frequency clock is turned off and a high frequency clock arranged to provide a high frequency clock signal is turned on.

In another embodiment, computer program product for managing power in a display controller having an on-board power supply coupled to a host device having an off-board power supply by way of a connector is disclosed. The computer program product includes computer code for determining if the on-board power supply is active, computer code for providing power to the display controller by the off-board power supply by way of the connector when it is determined that the on-board power supply is not active, computer code for turning on a low frequency clock arranged to provide a low frequency clock signal, computer code for providing power to the display controller by the on-board power supply only when it is determined that the on-board power supply is active, computer code for turning off the low frequency clock, computer code for turning on a high frequency clock arranged to provide a high frequency clock signal, and computer readable medium for storing the computer code.

DESCRIPTION OF AN EMBODIMENT

Figure 1:
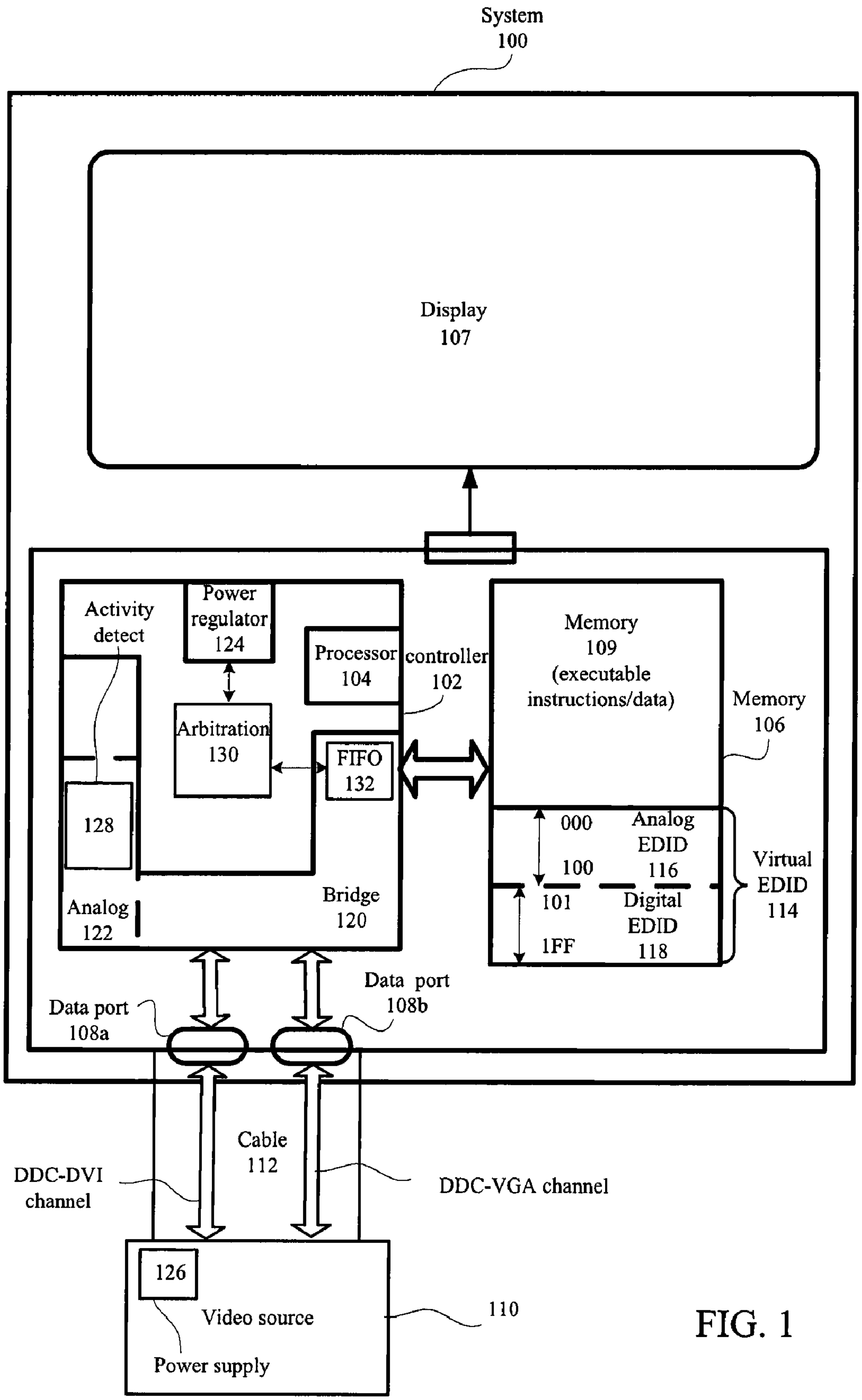
FIG. 1 shows a system that includes an implementation of an inventive display controller in accordance with an embodiment of the invention.

Reference will now be made in detail to a particular embodiment of the invention, an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

A DDC monitor (Display Data Channel) includes a storage device, such as an EEPROM, that stores EDID regarding the capabilities of the monitor, such as the monitor's resolution and refresh rates. In monitors that support a "dual interface" (i.e., where both analog and digital connectors supported), there are typically two separate standard EDID ROM devices, located on the flat panel controller board that store the analog and digital EDID, respectively. In addition to the EDID ROM devices, monitors also include a monitor controller that itself includes a processor having associated program memory storage configured as a programmable ROM device typically arranged as a serial peripheral interface (SPI) flash serial ROM. SPI Flash ROM is required on FLAT Panel Controller board to keep essential firmware routine of controlling panel in itself. These routines will be called by our on-chip microcontroller to execute necessary commands at certain time. It should be noted that a serial peripheral interface (SPI) is an interface that enables the serial (i.e., one bit at a time) exchange of data between a number of devices (at least one called a master and the others called a slave) that operates in full duplex mode. By full duplex, it is meant that data can be transferred in both directions at the same time. The SPI is most often employed in systems for communication between the central processing unit (CPU) and peripheral devices. It is also possible to connect two microprocessors by means of SPI.

With this in mind, the invention takes advantage of any unused portion(s) of the processor memory (such as the SPI flash serial ROM) to store the EDID thereby eliminating the costly use of extraneous memory devices to store EDID. In this way, by using the SPI Flash ROM already available to the processor to store the EDID, the invention eliminates the costs of having separate ROMs that were heretofore dedicated to storing the EDID only. In this way, the EDID is made available to the DDC ports (both analog and digital, if necessary) without having two separate EDID ROM devices. The invention provides a virtual EDID read operation within the limited power budget currently allowed for DDC port cables.

The invention will now be described in terms of a display controller circuit. It should be noted that although the display controller is described in terms of a flat panel display controller suitable for use in any number and kind of flat panel display monitors, the inventive controller circuit is suitable for any type display deemed appropriate. Accordingly, the flat panel display described herein includes liquid crystal display (LCD) type monitors suitable for use with computers and any other device requiring a display.

FIG. 1 shows a system 100 that includes an implementation of an inventive display controller 102 in accordance with an embodiment of the invention. As shown, the display controller 102 includes a processor 104 coupled to a memory device 106 in the form of an SPI-ROM 106 arranged to store both the EDID associated with a display 107 at specific memory locations separate and distinct from those memory locations 109 to store executable instructions and associated data processed by the processor 104. In the described embodiment, the system 100 also includes a number of data ports 108 that provide a transmission link between an external video source 110 (such as a computer or PC host) and the display controller 102. Generally speaking, the system 100 can include any number and type of data ports 108, however, for sake of this discussion, the system 100 is taken to be a dual interface type system that includes a Display Data Channel (DDC) type digital port (referred to as DDC-DVI port 108*a*) and a DDC analog data port (referred to as DDC-VGA port 108*b*). The display controller 102 is coupled to the video source 110 by way of a cable 112 using the DDC-VGA port 108*b* for analog displays and the DDC-DVI port 108*a* for digital displays. It should be noted that the DDC standard is a standard that defines a communication channel between a monitor and a display adapter included in a video source to which it is connected. The monitor uses this channel to convey its identity and capabilities to the display adapter.

In the described embodiment, the SPI-ROM 106 is partitioned to include a virtual EDID portion 114 that in turn is partitioned into an analog EDID portion 116 used to store analog display data and a digital EDID portion 118 used to store digital display data. In a particular implementation, the analog EDID portion 116 spans memory locations 000-100 whereas the digital EDID portion 118 spans memory locations 101-1FF but can, of course, be arranged in any manner deemed appropriate.

A portion of the controller 102 is partitioned into what is referred to as a bridge section 120 that acts as a bridge between the DDC-VGA port 108*b* and the DDC-DVI port 108*a* and the SPI Flash ROM 106. (The bridge section 120 is described in more detail below with reference to FIG. 2). It should be noted, that the bridge section 120 also includes an analog portion 122. During operation, any EDID read request from one of the ports 108 is acted upon by the bridge section 120 by accessing that portion of the ROM 106 that stores the appropriate EDID (portion 116 for analog data and portion 118 for digital data). The bridge section 120, in turn, passes the data read from the SPI Flash ROM 106 back to the requesting port.

In the described embodiment, the controller 102 conforms to the Inter-IC bus (I2C) protocol that describes a communication link between integrated circuits having 2 active bidirectional wires called SDA (Serial DAta line) and SCL (Serial CLock line) and a ground connection. Every device connected to the I2C bus has its own unique address that can act as a receiver and/or transmitter, depending on the functionality. For example, an LCD driver is only a receiver, while a memory or I/O chip can be both transmitter and receiver.

Figure 3:
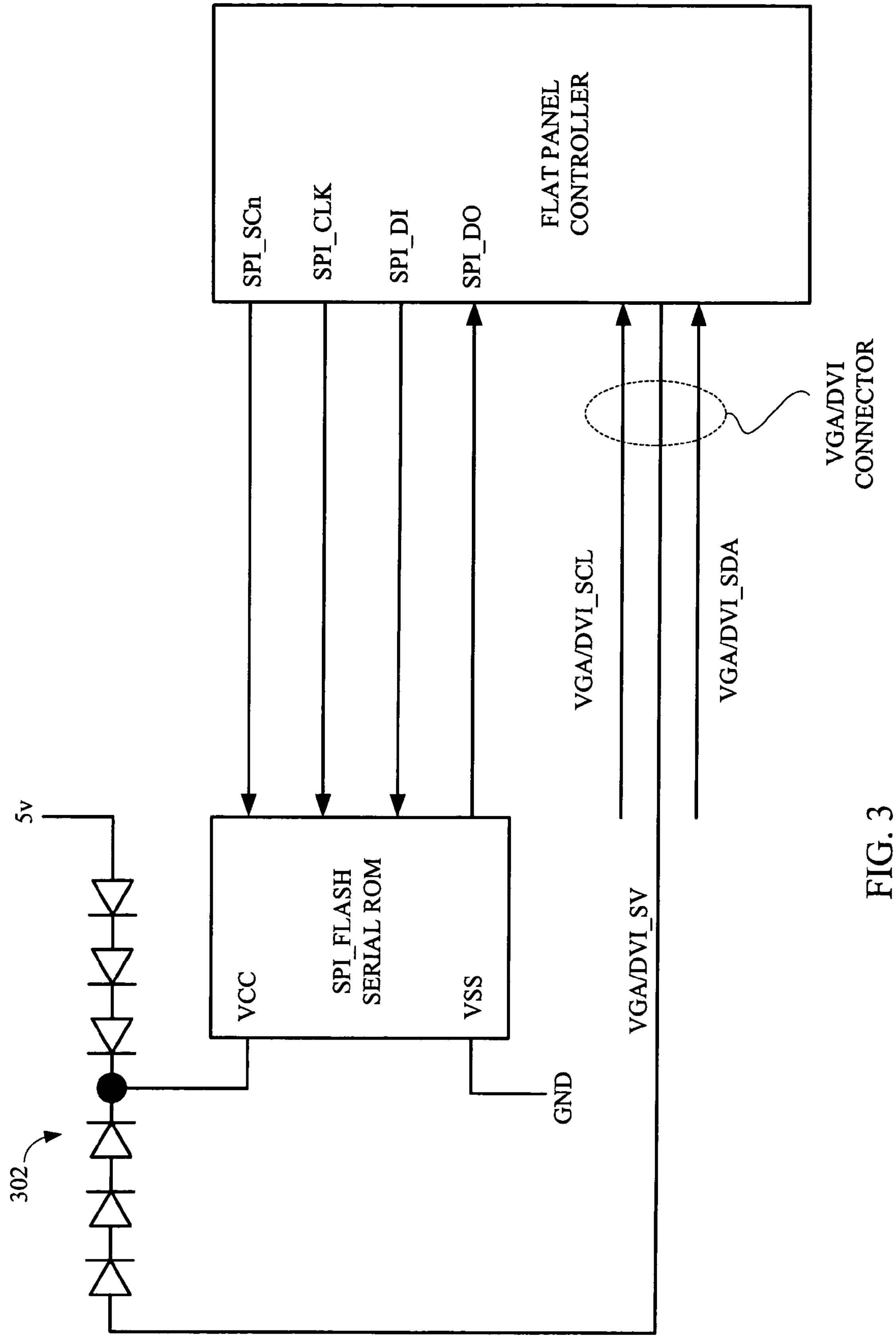
FIG. 3 shows a schematic of a cable and its associated channel in accordance with an embodiment of the invention.

Accordingly, during an I2C burst read, the bridge section 120 converts each byte of EDID related data to serial bits of information and passes it over a 2-wire I2C bus of the requesting DDC port. During what is referred to as OFF_Mode, (during which an on-board power regulator 124 is OFF as detected by the analog portion 122) power from an external power supply 126 is supplied to the controller 102 and the SPI-ROM 106 by way of either of an active one of the DDC ports (i.e., DDC-DVI port 108*a* or DDC-VGA port 108*b*) via the cable 112 and its associated channel as shown in FIG. 3. In this way, even though the power regulator 124 included in the controller 102 is powered off, the bridge section 120 and the ROM 106 still receive sufficient power to provide the necessary EDID during boot-up. During a power switching transition (i.e., between the OFF_MODE when the on-board power regulator 124 is off and the ON_MODE when the on-board power regulator 124 is on, and vice versa) the analog portion 122 senses when the on-board power regulator 124 is switched from off to on, and vice versa. During the OFF-mode, both the bridge section 120 and the SPI FLASH ROM 106 are both supplied power by one or the other of the DDC ports 108 by way of the cable 112. In the described embodiment, the power supply 126 acts to provide power through two branches of cascaded diodes 302 shown in FIG. 3 (it should be noted that for simplicity, only one of the connectors is shown). In order to avoid latch up problems in the Off-_Mode (when essentially the only portion of the controller 102 that is powered is the bridge section 120) digital logic in the bridge section 120 is set to known state.

In the case when the power goes from OFF to ON, the analog section 122 detects the on-board regulator 124 being active and providing power and as a result switches from the active one of the DDC ports 108 that is providing power from the power supply 126 to the now active on-board regulator 124. In this way, the bridge section 120 is always receiving power since any power transition between on-board and off-board power supplies is detected and the appropriate switching action is taken thereby avoiding any power switching glitches.

It should be noted that during a power transition from OFF to ON (i.e., when the power regulator 124 is turned on) any unfinished EDID read cycle is allowed to continue to the end of its cycle. In the context of this discussion, an unfinished EDID read cycle is that situation when the requesting DDC port is reading the EDID from the ROM 106 and the I2C STOP condition has not reached yet. During the period of time required to complete the EDID read operation, the controller 102 waits for the end of the unfinished EDID read cycle before switching to the On Mode for any subsequent EDID read request. During the time when the on-board power regulator 124 is turned on (On-Mode), the bridge section 120 arbitrates between service requests of the processor 104 for other client devices and EDID read requests from the ports 108 to the SPI FLASH ROM 106.

An auto activity detection circuit 128 (described in more detail below) located in the analog portion 122 of the bridge section 120 is designed to detect when the power regulator 124 in the controller 102 is powered on or off. In the described embodiment, the detecting is based upon a determination of a current $T_{CLK}$ activity, where $T_{CLK}$ is flat panel controller internal clock. For example, in the case where the $T_{CLK}$ activity indicates that an on-board crystal clock is active, then the power regulator 124 is determined to be on, whereas, a low $T_{CLK}$ activity indicates that the power regulator 124 is determined to be off.

Since there is a limited power budget during the Off Mode, an RC based low frequency clock is activated to drive the bridge circuit 120 and an SPI_Flash ROM clock when the on-board power regulator 124 is off. However, during the On Mode the low frequency clock is turned off and the on-board crystal clock is activated since power for both the SPI_Flash ROM 106 and the bridge circuit 120 is then provided from the on-board power regulator 124. In this way, by seamlessly switching clocks, no glitch or malfunction during the EDID read or flat panel controller operation is likely to occur.

During the power-off mode, the power required for the virtual EDID operation is generated by the power supply 126 and provided by way of the cables 112. However, in the power on mode, the current requirement would increase since the controller 102 would be operating at a higher clock frequency. In this situation, the cable 112 would not be able to sustain the necessary current and, therefore, it is necessary to switch from the cable 112 to the onboard power supply 124. However, there are two conditions that need to be met to enable this switching. In any display product, there is a requirement for a reference clock ($T_{LCK}$) that can be generated with internal oscillator, external oscillator or clock source. The presence of this clock indicates that the chip is in power-on mode. The auto activity detection circuit 128 looks at this the clock signal $T_{CLK}$ and charges a capacitor based on whether it is toggling or low. The capacitor voltage drives an amplifier or inverter and causes a logic state change if it exceeds the threshold voltage of the amplifier or inverter. For example, in the display products, there is generally a microcontroller interface and it is possible to change the register bits once the controller is in power on mode. As explained above, the $T_{CLK}$ signal itself is sufficient to do the power switching. To make the system more robust, in addition to the $T_{CLK}$, a signal from the register bits is detected, which in the power off mode is low, or "0". Once the power is on, however, this bit can be programmed to high, or "1" using low frequency mode. The logic combination of this bit and $T_{CLK}$ (act and/act) is used to do the power switching.

Since the described controller 102 is I2C compliant, the I2C protocol specification states that any circuit connected to an I2C bus that initiates a data transfer on the bus is considered to be the bus master relegating all other circuits connected to the bus at that time be regarded as bus slaves. In the I2C protocol, when the slave cannot keep up with a master read or write command, the slave holds the bus (i.e., stalling the bus activity) by holding the I2C clock (one of two wire I2C) to low (referred to as clock stretching). Accordingly, since the controller 102 is slaved to the video source 110 (such as a PC host) as the master, when the PC host 110 wants to read EDID from the ROM 106 through either the DDC-VGA 108*b* or DDC-DVI port 108*a*, the VESA standard does not allow the controller 102 to hold either of the busses connected to the ports 108. In another words, the VESA standard assumes that the ROM 106 is always available and PC host 110 can read EDID from the ROM 106 through one or the other of the DDC ports 108. Therefore, in order to conform to the VESA standard and still remain I2C compliant, an arbitration circuit 130 provides for execution of both an EDID read request as well as request from other client devices inside controller 102 that require reading the ROM 106. In a particular embodiment, the arbitration scheme utilizes a FIFO 132 that holds EDID data read from ROM. While the requesting VGA DDC port reads the FIFO 134 (byte by byte), each byte of data is sent through the requesting DDC port (serial I2C port) bit by bit. When the FIFO 132 is almost empty, the FIFO 132 is again given access to the ROM 106 in order to satisfy any pending EDID read requests while other requesting clients are interrupted until such time as the FIFO 132 is replenished with appropriate data.

Figure 2:
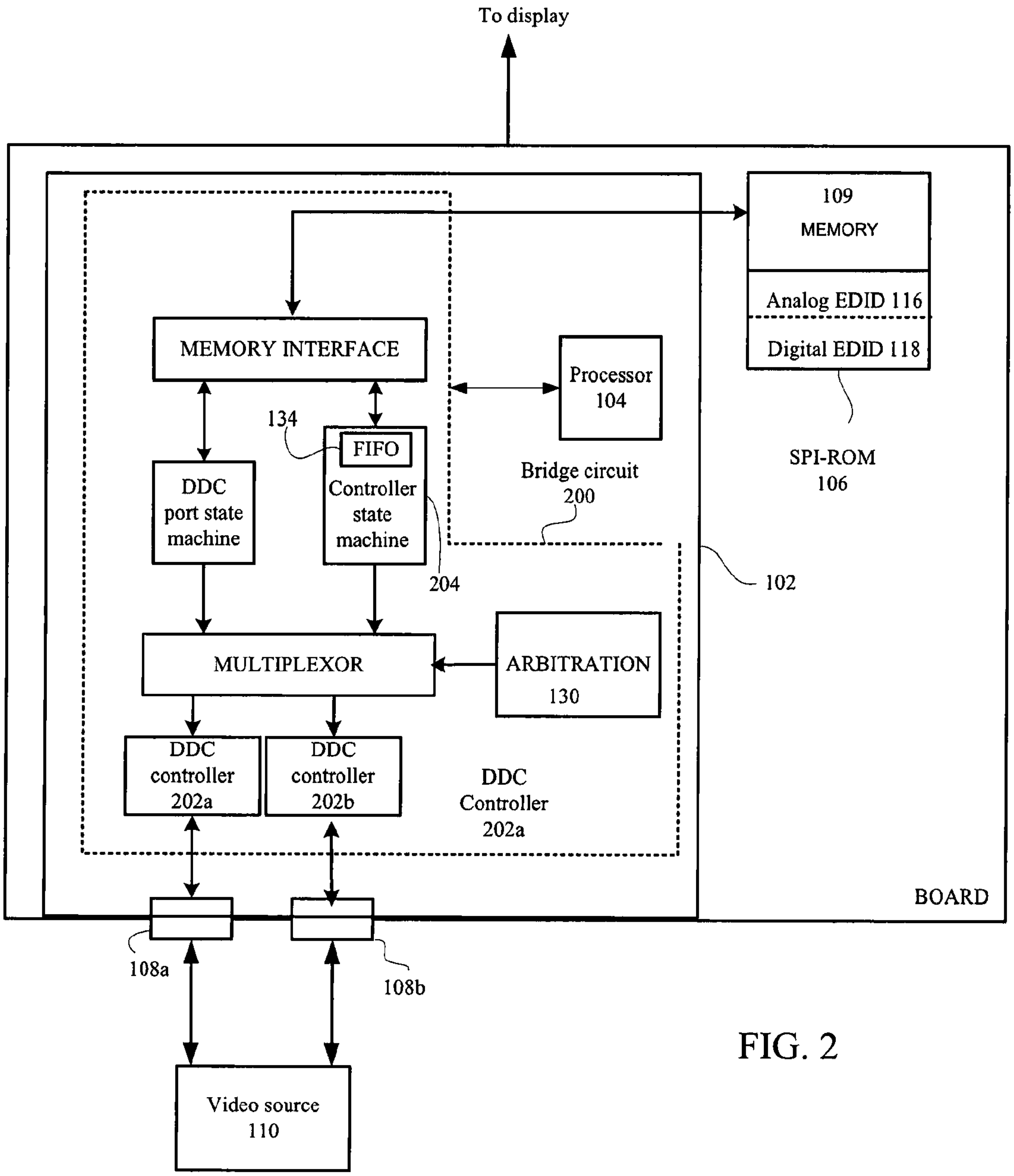
FIG. 2 shows a bridge circuit 200 in accordance with an embodiment of the invention.

FIG. 2 shows a bridge circuit 200 in accordance with an embodiment of the invention. It should be noted that the bridge circuit 200 is a particular implementation of the bridge circuit 120 shown and described in FIG. 1. The bridge circuit 200 includes a DDC PORT controller block 202 (202*a* associated with port 108*a* and 202*b* associated with 108*b*) for each of the DDC ports 108. When the power regulator 124 is powered off (Off_Mode), power is supplied by either of DDC ports cable (VGA/DVI), feeding power to the bridge section of the chip and the SPI_FLASH ROM 106. During this time, one of the DDC PORT controller blocks 202 (VGA/DVI) is responsible for sending an EDID read request to an SPI state machine (SPI_SM) controller 204. The SPI_SM controller 204 acts upon the EDID read request to read requested data from the appropriate portion of the SPI Flash ROM 106 and pass the read data back to the appropriate DDC_PORT controller 202. The DDC_PORT controller 202, in turn, converts each byte of EDID related data to serial bits of information and passes it over the I2C bus of active DDC port 108.

As discussed above, in the I2C protocol, when the slave device cannot keep up with a master read or write command, the slave device can hold the bus (more like stalling the bus activity) from doing any more activity by holding I2C clock (one of two wire I2C) to low (clock stretching). In the described embodiment, the flat panel controller 102 is the slave device and PC host is the master. When the PC host wants to read EDID data from the ROM 106 through either the VGA DDC port 108*b* or DVI DDC port 108*a*, the VESA standard presumes that the ROM 106 is always available (i.e., the PC host can read EDID data from it through the DDC port 108). Therefore, the VESA standard does not provide for the slave device (controller 102) to hold the requesting DDC port 108 when data is not ready. Therefore, in order to maintain compliance with the VESA standard, the arbitration block 130 provides an arbitration service that enables processor 104 to keep up with both an EDID read request rate, as well as request from other circuits inside flat panel controller 102 demanding access to the ROM 106.

In order to facilitate arbitrating ROM access requests, the FIFO 134 (which in this case is 8 bytes deep) holds EDID read from ROM 106. The requesting DDC port interface block reads the requested EDID from the FIFO 132 (byte by byte) and sends each byte of data through the requesting DDC port bit by bit to the PC host 110. When the FIFO 132 is almost empty, the processor 104 is flagged indicating that the processor 104 may be required to interrupt other requesting client devices in order to fill the FIFO 132 with additional requested EDID. In this way, the requesting DDC port is provided access to the ROM 106 as needed without the need to resort to clock stretching thereby maintaining compliance to the VESA standard. When the FIFO 132 is replenished, the processor 104 releases the flag and any other requesting client is permitted access to the ROM 106.

Figure 4:
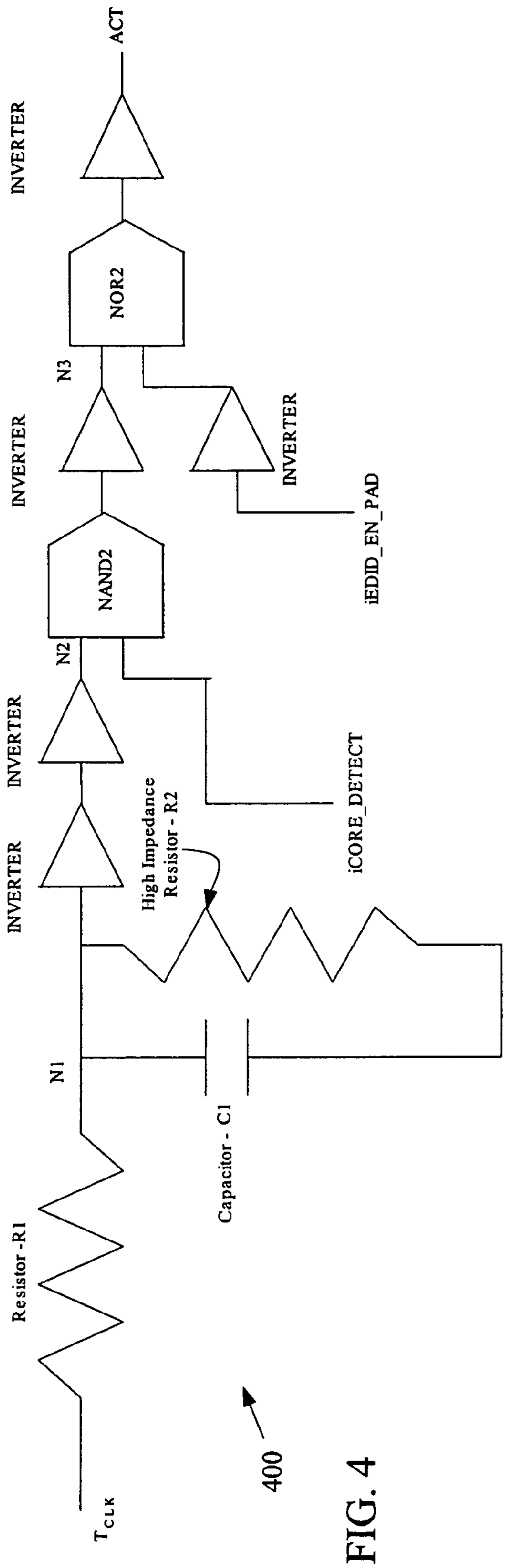
FIG. 4 shows an exemplary auto activity detection circuit 400 in accordance with an embodiment of the invention.

FIG. 4 shows an exemplary auto activity detection circuit 400 in accordance with an embodiment of the invention. The auto activity detection circuit 400 is designed to detect when the power regulator in the controller is powered on or off. When the power regulator is powered on, the $T_{CLK}$ is toggling otherwise, the $T_{CLK}$ is 0 when the power regulator is powered off. The auto activity detection circuit 400 will charge the capacitor C1 when the $T_{CLK}$ is toggling and the node N1 will charge to high voltage causing node N2 to be high. If the iCORE_DETECT is set to high from the register control, node N3 will be high resulting in an output ACT signal to be high indicating that the controller power is on. The ACT can also be set to ONE by way of the iEDID_EN_PAD enable signal (which is a bond option signal).

Alternatively, when the $T_{CLK}$ is zero, the capacitor C1 is not charging and the high impedance resistor R2 will pull down the Node N1 causing node N2 to be low which makes node N3 low resulting in the output ACT signal being low indicating that the controller power is off.

Figure 5A:
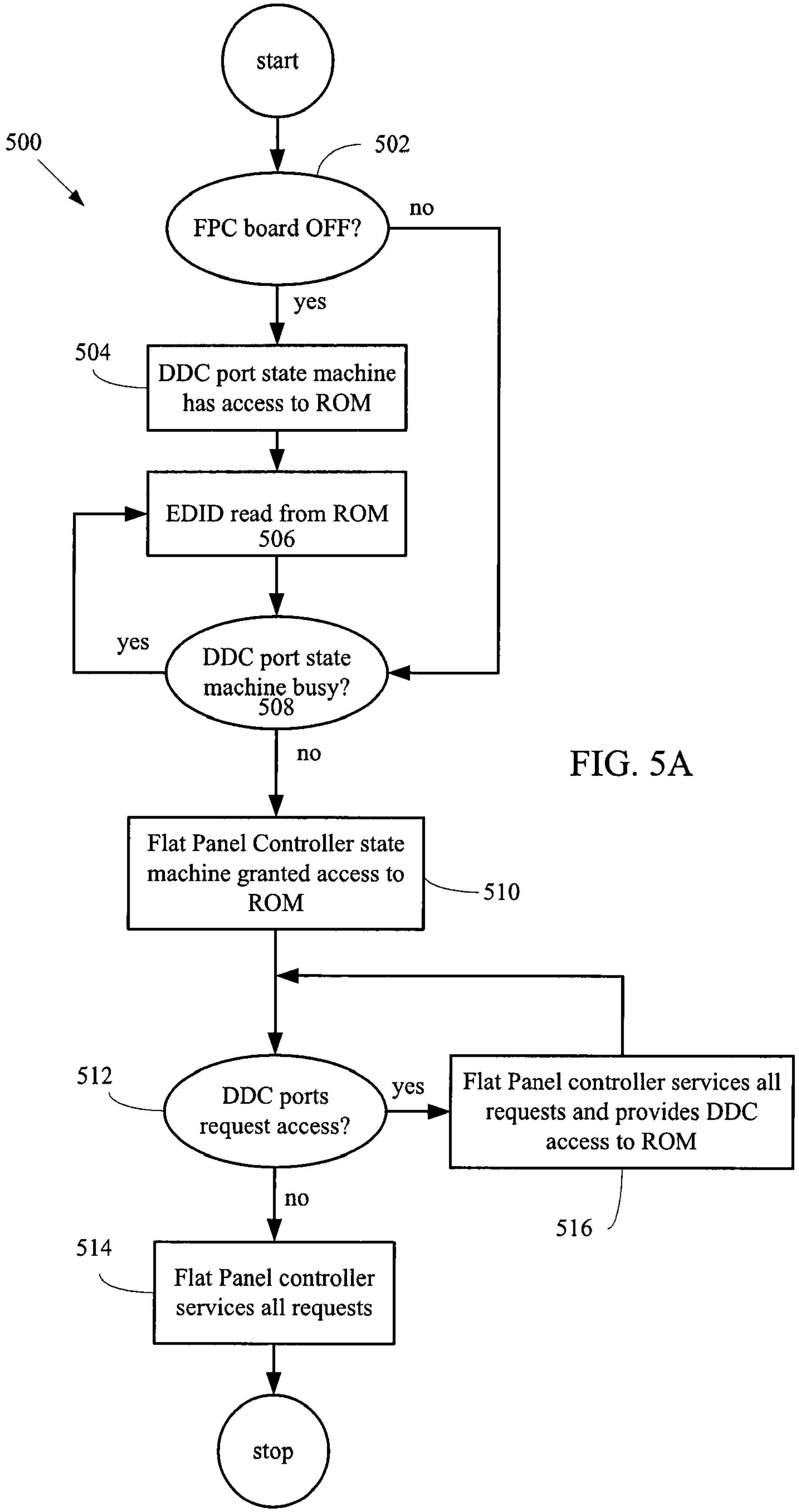
FIG. 5A shows a flowchart detailing a process 500 in accordance with an embodiment of the invention.

FIG. 5A shows a flowchart detailing a process 500 in accordance with an embodiment of the invention. The process 500 begins at 502 by a determination if the flat panel controller (FPC) is powered on. If the controller is determined to be powered on, the a DDC port state machine is granted access to the virtual EDID ROM at 504 and at 506, the requested EDID is read from the virtual EDID ROM and at 508 a determination is made whether or not the DDC port state machine is busy. Returning to 502, if, in the alternative, the controller has been determined to be powered off, then control is passed directly from 502 to 508 where if the DDC state machine is determined to be busy, then control is passed back to 506, otherwise, the controller state machine is granted access to the ROM at 510. At 512, a determination is made if other ports are requesting access to the ROM. If no other ports are requesting access, then the controller services all requests at 514, otherwise, at 516 the controller services all requests and provides any requesting port access to the ROM.

Figure 5B:
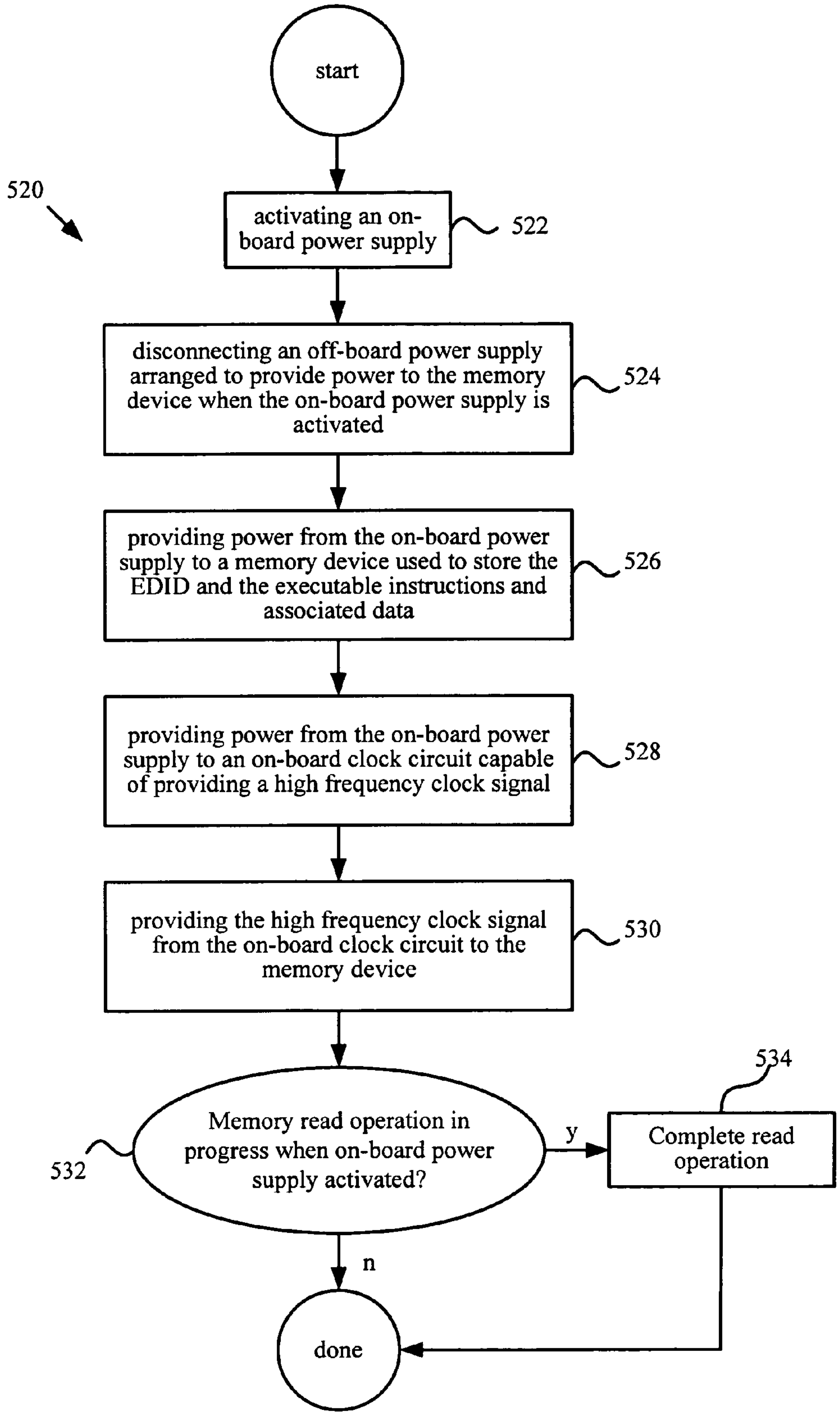
FIG. 5B shows a flowchart detailing a process for acquiring extended display identification data (EDID) in a video controller having a processor for processing executable instructions and associated data and a number of data ports in accordance with an embodiment of the invention.

FIG. 5B shows a flowchart detailing a process 520 for acquiring extended display identification data (EDID) in a video controller having a processor for processing executable instructions and associated data and a number of data ports in accordance with an embodiment of the invention. The process 520 begins at 522 by activating an on-board power supply and at 524 disconnecting an off-board power supply arranged to provide power to the memory device when the on-board power supply is activated. Next at 526 providing power from the on-board power supply to a memory device used to store the EDID and the executable instructions and associated data and at 528 providing power from the on-board power supply to an on-board clock circuit capable of providing a high frequency clock signal. At 530, providing the high frequency clock signal from the on-board clock circuit to the memory device, and at 532 if a memory read operation was in progress when the on-board power supply was activated, then completing the memory read operation at 534.

Figure 5C:
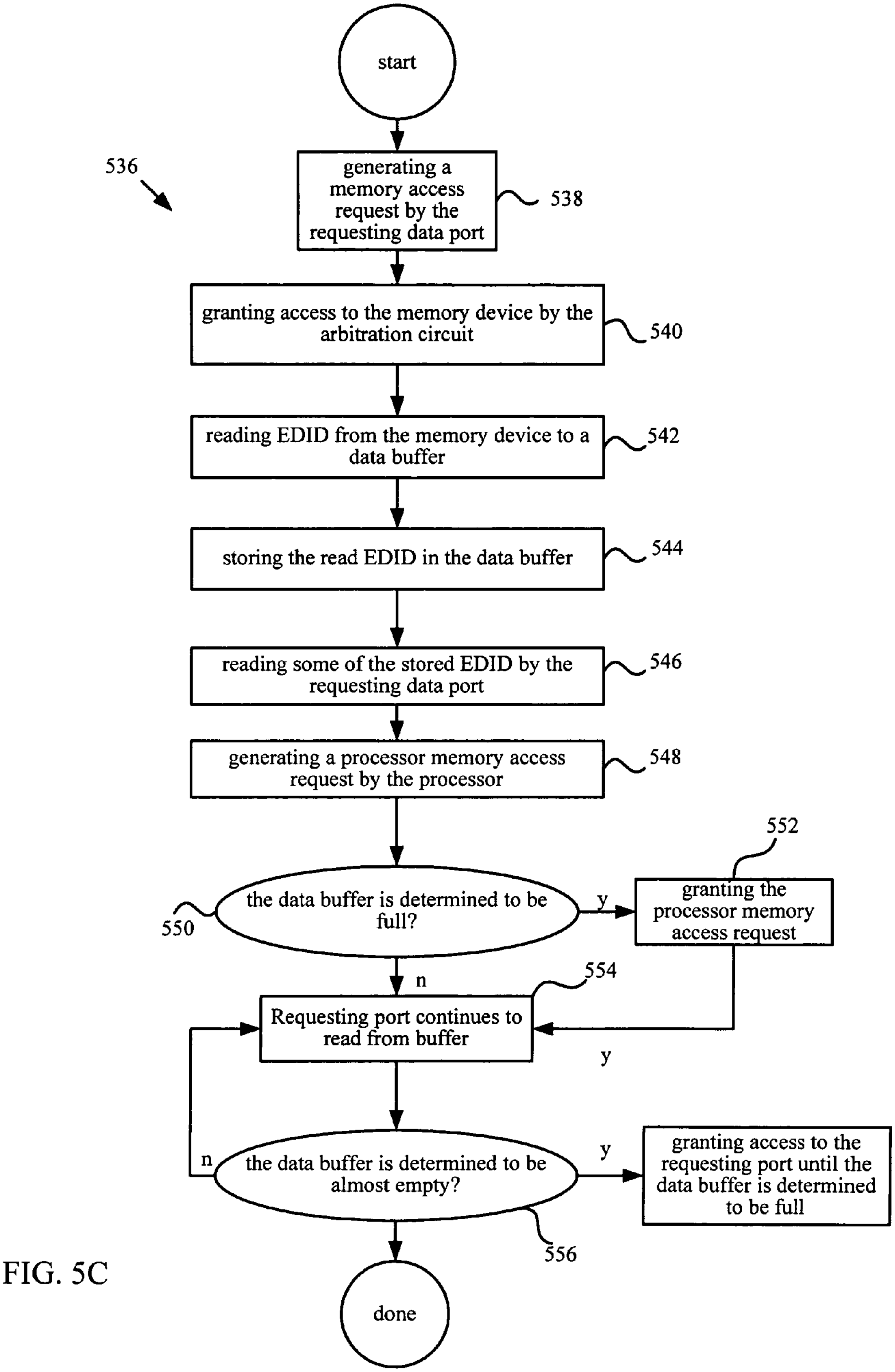
FIG. 5C shows a flowchart that details a process for arbitrating the acquisition of extended display information data (EDID) in accordance with an embodiment of the invention.

FIG. 5C shows a flowchart that details a process 536 for arbitrating the acquisition of extended display information data (EDID) in accordance with an embodiment of the invention. The process 536 begins at 538 by generating a memory access request by the requesting data port and at 540, granting access to the memory device by the arbitration circuit. At 542, reading EDID from the memory device to a data buffer and at 544 storing the read EDID in the data buffer and at 546 the requesting port reads some of the stored EDID by the requesting data port. At 548, generating a processor memory access request by the processor and at 550, a determination is made whether or not the data buffer is determined to full. If it is determined that the data buffer is full, then at 552 the processor memory access request is granted, and in any case, at 554 the requesting port continues to read from the buffer. At 556, a determination is made whether or not the buffer is almost empty and if it is determined to be almost empty, then at 558, the requesting port is granted access to the memory, otherwise, the requesting port continues to read data from the buffer.

Figure 5D:
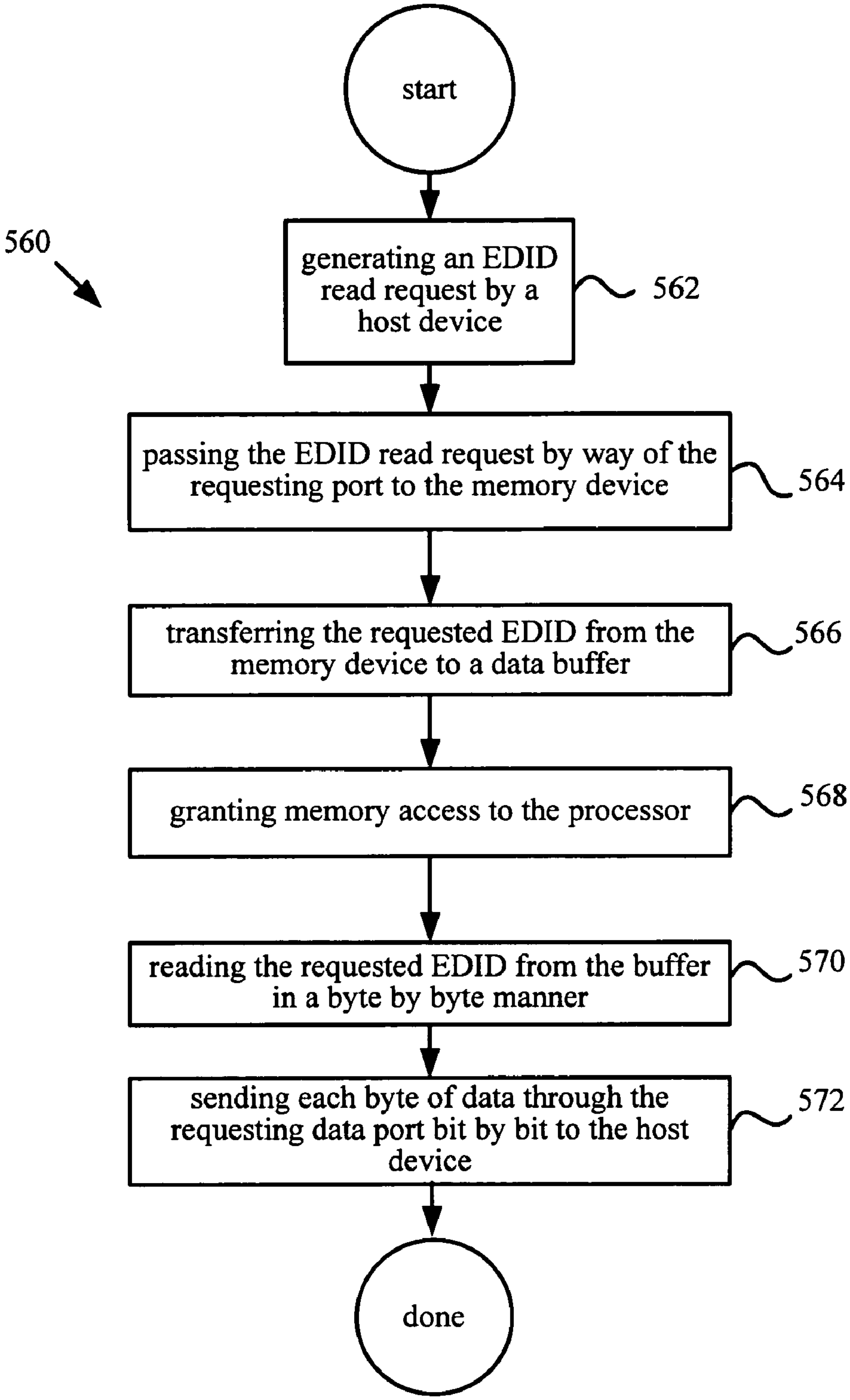
FIG. 5D shows a flowchart that details a process for the acquisition of EDID using inter-IC (IC2) protocol in accordance with an embodiment of the invention.

FIG. 5D shows a flowchart that details a process 560 for the acquisition of EDID using inter-IC (IC2) protocol in accordance with an embodiment of the invention. The process 560 begins at 562 by generating an EDID read request by the host device and at 564 passing the EDID read request by way of the requesting port to the memory device. At 566, the requested EDID is transferred from the memory device to a data buffer while at 568, memory access is granted to the processor, and at 570 reading the requested EDID from the buffer in a byte by byte manner; and sending each byte of data through the requesting data port bit by bit to the host device at 572. In this way, the requesting data port is provided access to the memory device as needed without clock stretching thereby maintaining compliance to the VESA standard.

Figure 5E:
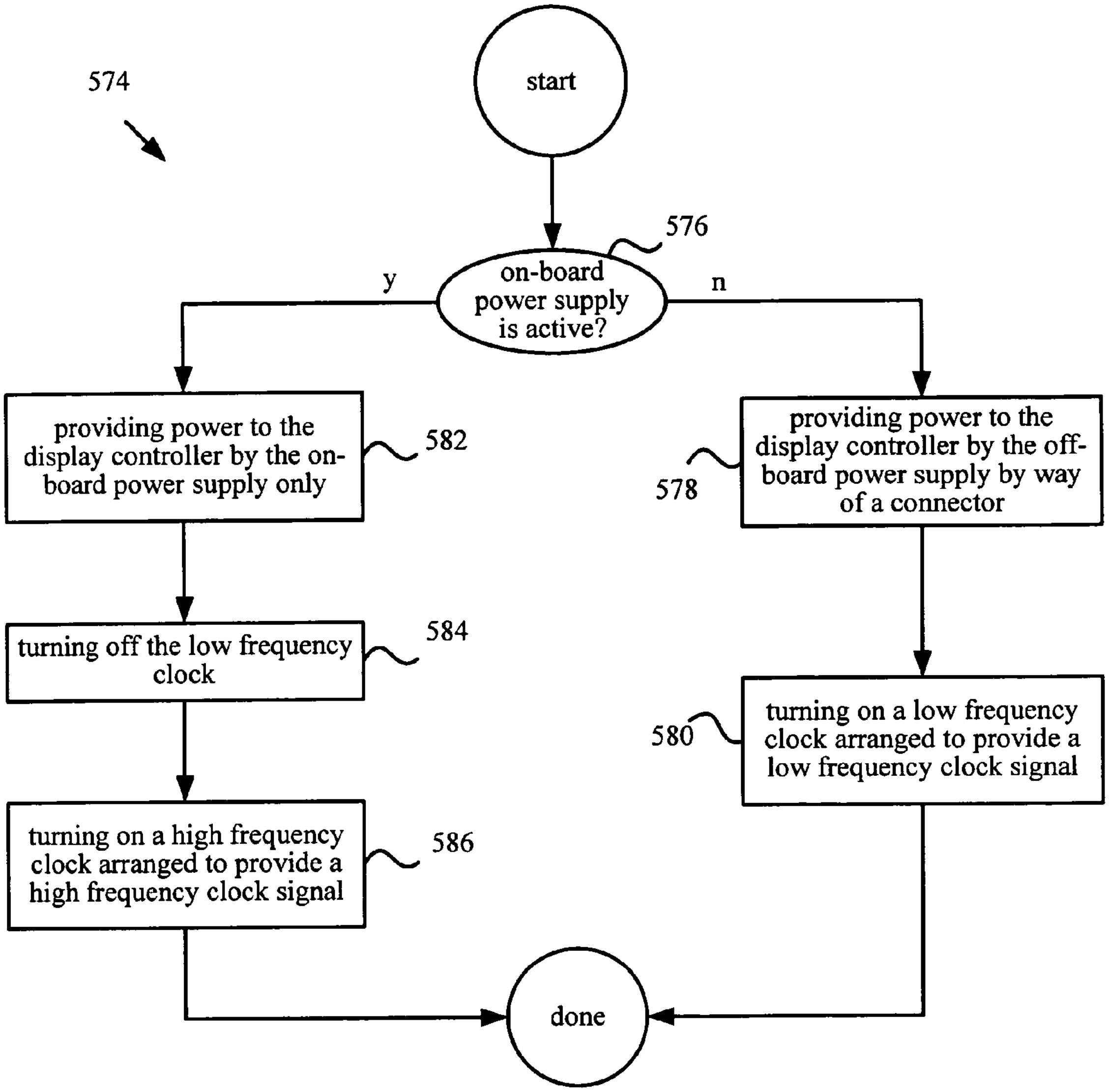
FIG. 5E shows a flowchart that details a power management procedure in accordance with an embodiment of the invention.

FIG. 5E shows a flowchart that details a power switching procedure 574 suitable for maintaining a low power budget in accordance with an embodiment of the invention. The process 574 begins at 576 by determining if an on-board power supply is active. If the on-board power supply is not active, then power is provided to the display controller by an off-board power supply by way of the connector at 578 and at 580 a low power, low frequency clock arranged to provide a low frequency clock signal is turned on thereby preserving power.

However, when at 576, it is determined that the on-board power supply is not active, then at 582 power is supplied to the display controller by the on-board power supply only and at 584, the low frequency clock is turned off and at 586, the high frequency clock arranged to provide a high frequency clock signal is turned on.

Figure 5F:
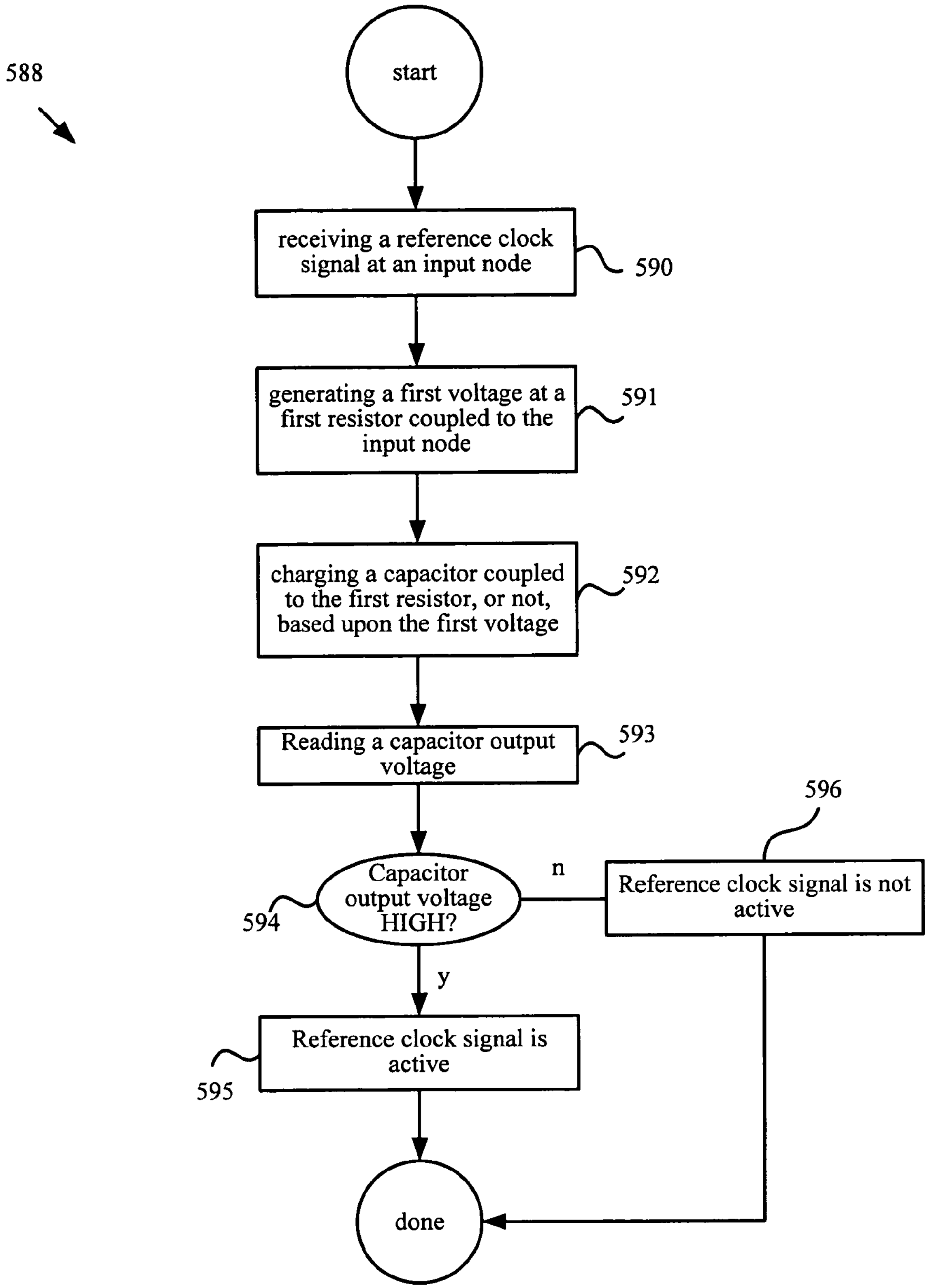
FIG. 5F shows a flowchart that details a process for power switching in a display controller in accordance with an embodiment of the invention.

FIG. 5F shows a flowchart that details a process 588 for auto detecting of a active power supply in a display controller in accordance with an embodiment of the invention. The process 588 starts at 590 by receiving a reference clock signal at an input node and at 591 generating a first voltage at a first resistor coupled to the input node. At 592, charging a capacitor coupled to the first resistor, or not, based upon the first voltage and at 593, reading a capacitor output voltage. At 594, a determination is made whether or not the capacitor output voltage is HIGH and if it is determined to be HIGH, then at 595, the reference clock signal is determined to be active and on the other hand, if the capacitor output voltage is not HIGH, then at 596, the reference clock signal is determined to be not active.

Figure 6:
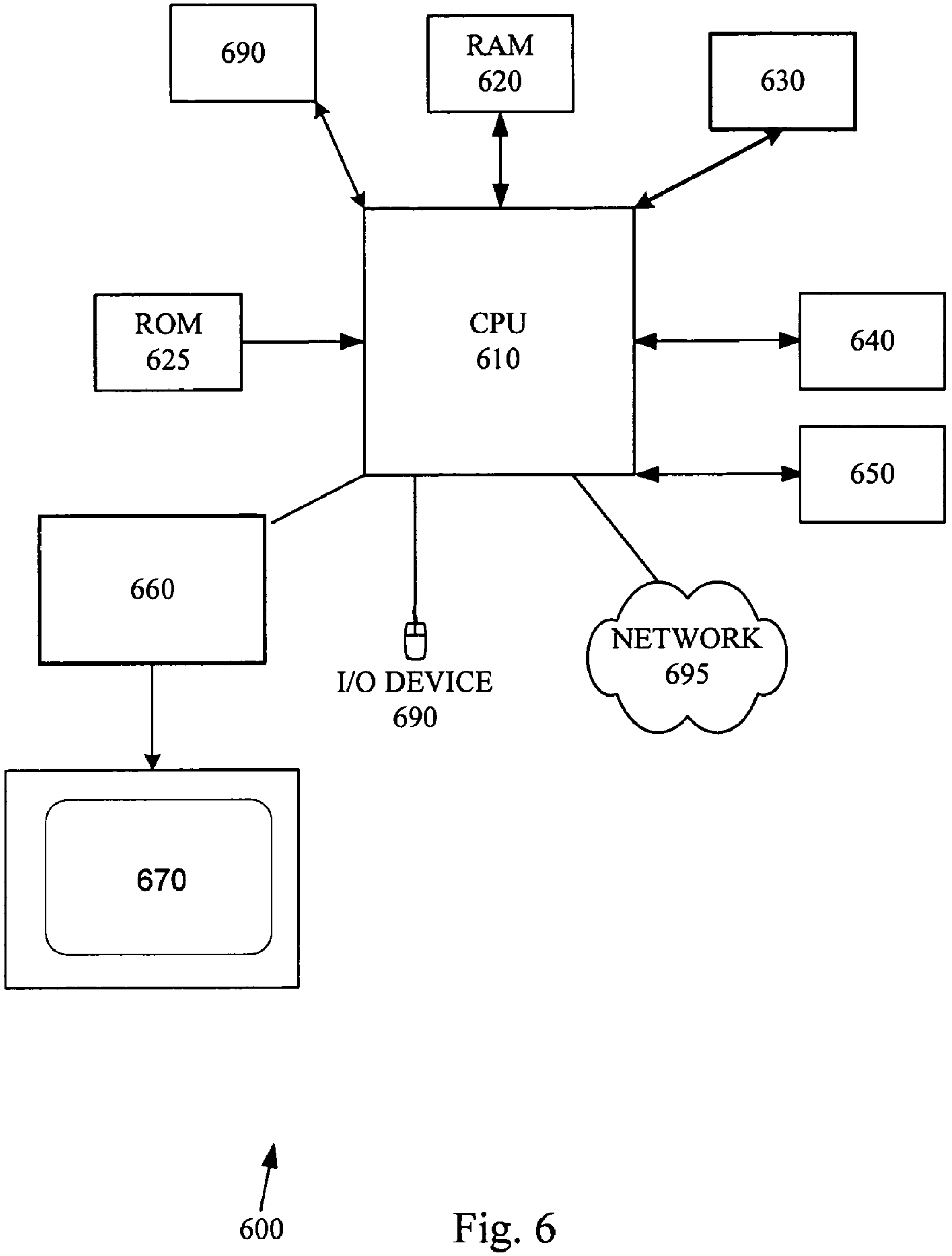
FIG. 6 illustrates a graphics system 600 in which the inventive circuit 602 can be employed.

FIG. 6 illustrates a graphics system 600 in which the inventive circuit 100 can be employed. System 600 includes central processing unit (CPU) 610, random access memory (RAM) 620, read only memory (ROM) 625, one or more peripherals 630, primary storage devices 640 and 650, graphics controller 660, and digital display unit 670. CPUs 610 are also coupled to one or more input/output devices 690 that may include, but are not limited to, devices such as, track balls, mice, keyboards, microphones, touch-sensitive displays, transducer card readers, magnetic or paper tape readers, tablets, styluses, voice or handwriting recognizers, or other well-known input devices such as, of course, other computers. Graphics controller 660 generates image data and a corresponding reference signal, and provides both to digital display unit 670. The image data can be generated, for example, based on pixel data received from CPU 610 or from an external encode (not shown). In one embodiment, the image data is provided in RGB format and the reference signal includes the $V_{SYNC}$ and $H_{SYNC}$ signals well known in the art. However, it should be understood that the present invention could be implemented with image, data and/or reference signals in other formats. For example, image data can include video signal data also with a corresponding time reference signal.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a specific embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method of managing power in a display controller having an on-board power supply coupled to a host device having an off-board power supply by way of a connector, comprising:

determining if the on-board power supply is active;

when it is determined that the on-board power supply is not active, then providing power to the display controller by the off-board power supply by way of the connector;

turning on a low frequency clock arranged to provide a low frequency clock signal;

when it is determined that the on-board power supply is active, then providing power to the display controller by the on-board power supply only once the display controller finishes partially completed display controller operations;

turning off the low frequency clock;

turning on a high frequency clock arranged to provide a high frequency clock signal;

wherein the display controller remains fully operational regardless of changes in the state of the on-board power supply.

2. The method as recited in claim 1, wherein when the on-board power supply is active and providing power to the display controller then a display controller power mode is a power-on mode.

3. The method as recited in claim 2, wherein when the on-board power supply is not active and power to the display controller is provided by the off-board power supply by way of the connector then the display controller mode is a power-off mode.

4. The method as recited in claim 3, further comprising: determining the display controller mode.

5. The method as recited in claim 4, further comprising: detecting a reference clock signal ($T_{LCK}$) that can be generated with internal oscillator, external oscillator or clock source wherein the presence of the reference clock signal($T_{LCK}$) indicates that the controller mode is the power-on mode.

6. Computer program product executable by a processor for managing power in a display controller having an on-board power supply coupled to a host device having an off-board power supply by way of a connector, comprising:

computer code for determining if the on-board power supply is active;

computer code for providing power to the display controller by the off-board power supply by way of the connector when it is determined that the on-board power supply is not active;

computer code for turning on a low frequency clock arranged to provide a low frequency clock signal;

computer code for providing power to the display controller by the on-board power supply only once the display controller finishes partially completed operations when it is determined that the on-board power supply is active;

computer code for turning off the low frequency clock;

computer code for turning on a high frequency clock arranged to provide a high frequency clock signal, wherein the display controller remains fully operational regardless of changes in the state of the on-board power supply; and computer readable medium for storing the computer code.

7. The computer program product as recited in claim 6, wherein when the power supply is active and providing power to the display controller then a display controller power mode is a power-on mode.

8. The computer program product as recited in claim 7, wherein when the on-board power supply is not active and power to the display controller is provided by the off-board power supply by way of the connector then the display controller mode is a power-off mode.

9. The computer program product as recited in claim 8, further comprising:

computer code for determining the display controller mode.

10. The computer program product as recited in claim 9, further comprising:

computer code for detecting a reference clock signal ($T_{LCK}$) that can be generated with internal oscillator, external oscillator or clock source wherein the presence of the reference clock signal ($T_{LCK}$) indicates that the controller mode is the power-on mode.

11. A power manager unit coupled to a display controller having an on-board power supply coupled to a host device having an off-board power supply by way of a connector that:

provides power to the display controller from the off-board power supply by way of the connector when the on-board power supply is not active and turns on a low frequency clock arranged to provide a low frequency clock signal, and provides power to the display controller from the on-board power supply and turns off the low frequency clock and turns on the high frequency clock arranged to provide a high frequency clock signal when it is determined that the on-board power supply is active, capable of providing power to the display controller, and partially completed operations of the display controller operations are finished, wherein the display controller remains fully operational regardless of changes in the state of the on-board power supply.

12. The power manager unit as recited in claim 11, wherein when the on-board power supply is capable of providing power to the display controller, then the power manager unit disconnects the off-board power supply and re-connects the on-board power supply.

13. The power manager unit as recited in claim 12, wherein when the on-board power supply is active and providing power to the display controller then a display controller power mode is a power-on mode.

14. The power manager unit as recited in claim 13, wherein when the on-board power supply is not active and power to the display controller is provided by the off-board power supply by way of the connector then the display controller mode is a power-off mode.

15. The power manager unit as recited in claim 14, further comprising:

a display controller mode detector unit arranged to detect the display controller mode.

16. The power manager unit as recited in claim 15, further comprising:

a reference clock detector unit for detecting a reference clock signal indicative that the display controller mode is the power-on mode.

17. The power manager unit as recited in claim 16, wherein the reference clock signal can be generated by an internal oscillator or an external oscillator or a clock source.

* * * * *